Figure 1:
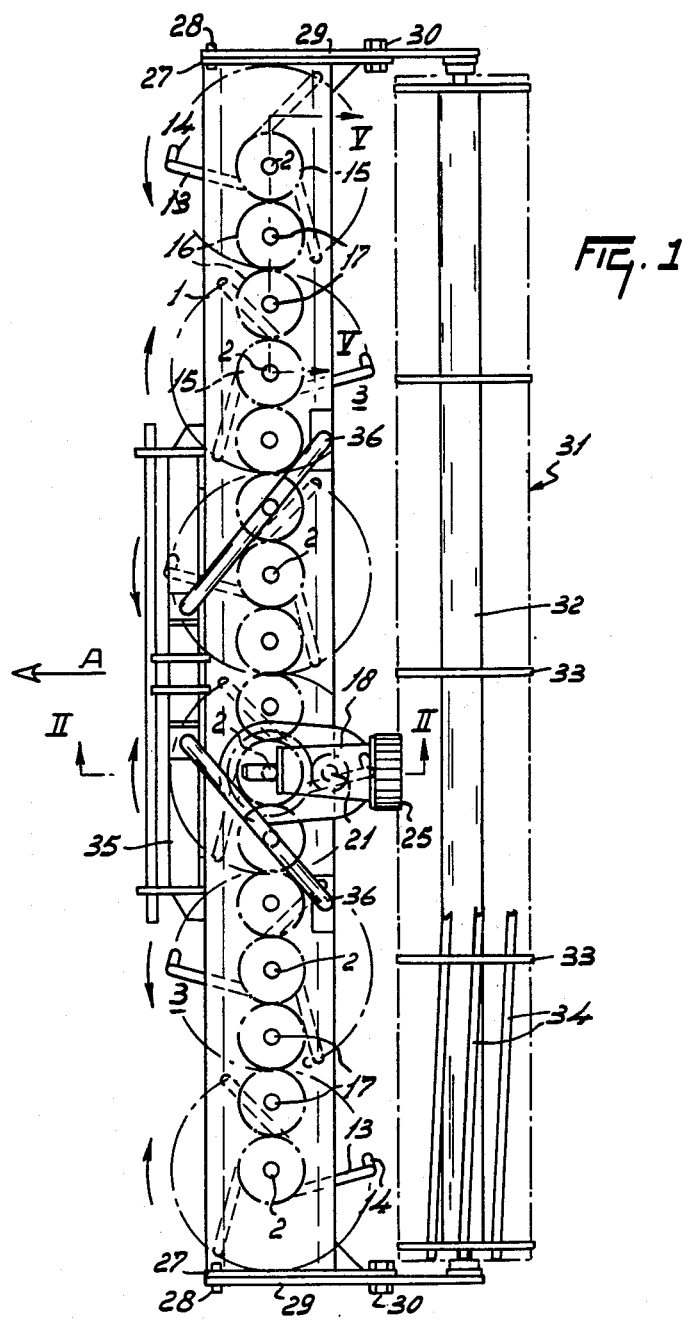

United States Patent [19]
van der Lely

[11] 4,111,265
[45] Sep. 5, 1978

[54] SOIL CULTIVATING MACHINES

[75] Inventor: Ary van der Lely, Maasland, Netherlands

[73] Assignee: C. van der Lely NV, Maasland, Netherlands

[21] Appl. No.: 724,627

[22] Filed: Sep. 20, 1976

[30] Foreign Application Priority Data

Sep. 26, 1975 [NL] Netherlands .................. 7511330

[51] Int. Cl.$^2$ ............................................. A01B 33/14
[52] U.S. Cl. ........................................ 172/59; 172/96
[58] Field of Search .................. 172/59, 111, 96, 48

[56] References Cited

U.S. PATENT DOCUMENTS

| | | | |
|---|---|---|---|
| 2,438,707 | 3/1948 | Kropp | 172/96 |
| 3,131,744 | 5/1964 | Lely | 172/111 |
| 3,667,551 | 6/1972 | Lely | 172/59 |
| 3,774,687 | 11/1973 | Lely | 172/59 |
| 3,945,441 | 3/1976 | Lely et al. | 172/59 |
| 3,946,816 | 3/1976 | Lely et al. | 172/59 |

FOREIGN PATENT DOCUMENTS 1,381,569  11/1964  France ................................... 172/111

*Primary Examiner*—Richard J. Johnson
*Attorney, Agent, or Firm*—Mason, Mason & Albright

[57] ABSTRACT

A soil cultivating implement has a row of tined soil working members that are driven to revolve about upwardly extending axes. The drive to the members includes meshed pinion gears and shafts of the members are mounted on every third pinion gear. The soil working members have tines, the inner ends of which are secured in recesses of plates near the axes of rotation of the working members. Each tine has an inner curved part and an elongated support portion to which downwardly, inclined soil working portions are integrally joined. The tines are free to deflect from their connections and neighboring soil working member tines work overlapping and/or adjoining strips of soil. The paths traced by the revolving tines spans a diameter that exceeds the width of two neighboring pinion gears.

7 Claims, 5 Drawing Figures

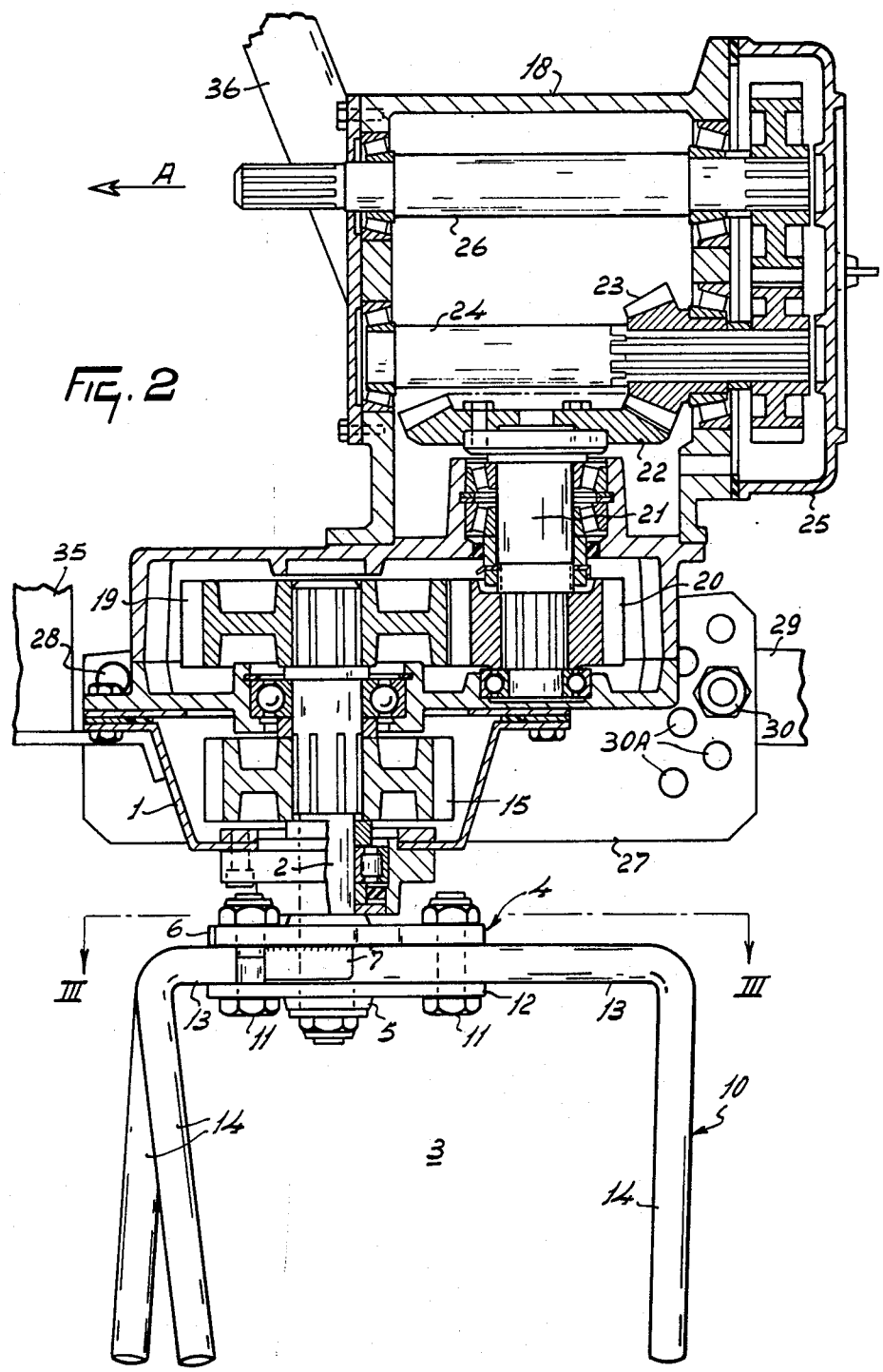

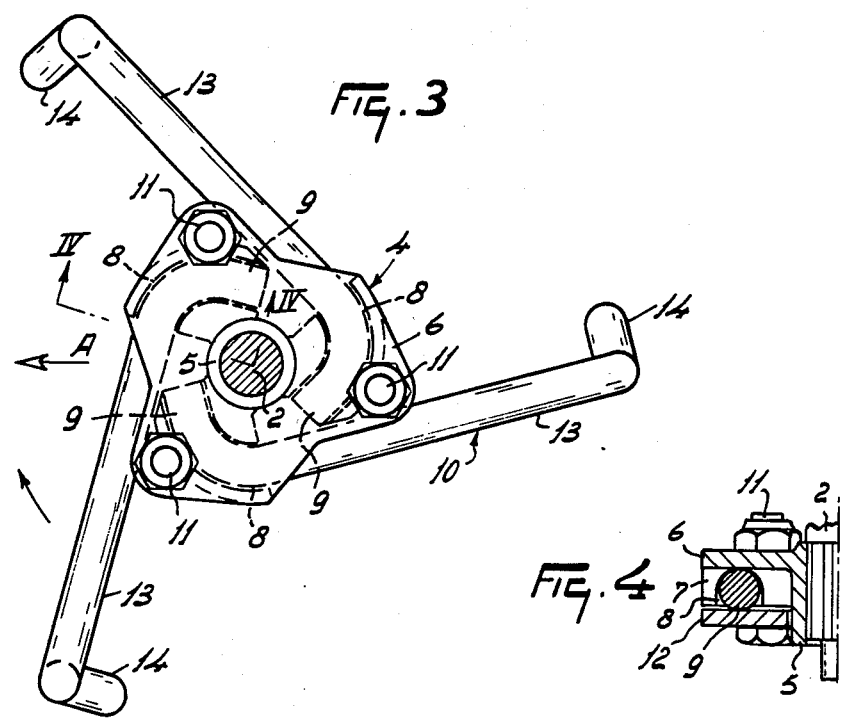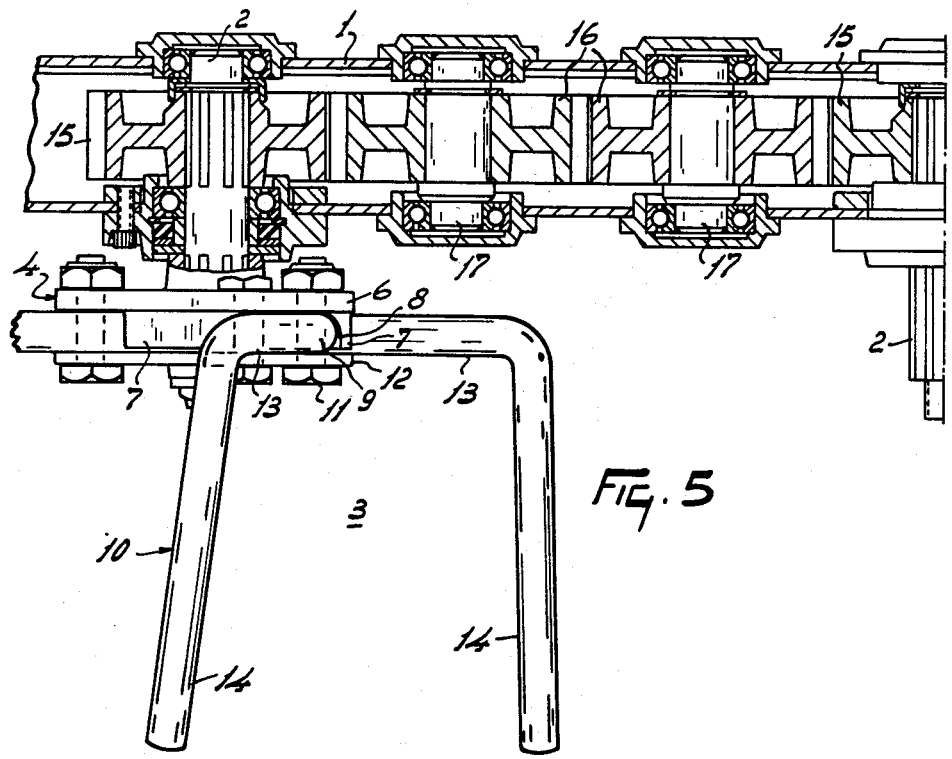

SOIL CULTIVATING MACHINES

According to the invention, there is provided a soil cultivating machine of the kind set forth, wherein driving means are provided for driving said soil working members about upwardly extending axes, said driving means having pinions on upwardly extending shafts whereby as seen in plan view the shafts of two neighbouring pinions are disposed inside the path described by a tine of a soil working member.

For a better understanding of the invention, and to show how the same may be carried into effect, reference will now be made, by way of example, to the accompanying drawings, in which:

FIG. 1 is a plan view of a soil cultivating implement in accordance with the invention, FIG. 2 is a section, to an enlarged scale, taken on the line II—II in FIG. 1, FIG. 3 is a section taken on the line III—III in FIG. 2, FIG. 4 is a section taken on the line IV—IV in FIG. 3, and FIG. 5 is a section, to an enlarged scale, taken on the line V—V in FIG. 1.

Referring to the accompanying drawings, the soil cultivating implement that is illustrated therein is in the form of a rotary harrow and comprises a hollow box-shaped frame portion 1 that extends substantially horizontally transverse, and usually substantially horizontally perpendicular, to the intended direction of operative travel of the implement that is indicated in FIGS. 1 to 3 of the drawings by an arrow A. The hollow frame portion 1 rotatably supports a plurality of soil working or cultivating members 3 of which there are six in the embodiment that is being described, it being emphasised, however, that this number of the members 3 is by no means mandatory and that more, or less, of them could be provided if desired. Each member 3 is secured to the lowermost end of a corresponding substantially vertical, or at least upwardly extending, shaft 2, the six shafts 2 being rotatably mounted (see FIGS. 2 and 5) in upper and lower walls of the frame portion 1 in such positions that their longitudinal axes (axes of rotation) are spaced apart from one another at regular intervals of substantially 50 cms. The lowermost end of each shaft 2 projects from beneath the bottom of the hollow frame portion 1 and is there externally splined to receive the internally splined hub 5 of a support 4 of the corresponding soil working or cultivating member 3. A retaining nut and co-operating washer (FIG. 2) co-operate with a short screwthreaded lower end portion of each shaft 2 in maintaining the corresponding hub 5 axially in position on the downwardly projecting splined portion of the shaft 2 concerned. An upper region of each support 4 comprises a plate 6 whose center is integral with, or rigidly secured to, the corresponding hub 5, said plate 6 having a rectangular inverse polygonal configuration that can conveniently be considered as being triangular although reference to FIG. 3 of the drawings will show that it is by no means strictly triangular. The lower surface of each plate 6 has downward projections 7 which are arranged to define recesses 8 of substantially semi-circular cross-section, there being three recesses 8 per plate 6 and those recesses being spaced apart from one another at regular 120° intervals around the longitudinal axis of the corresponding hub 5.

It can be seen in FIG. 3 of the drawings that each recess 8 comprises a portion that extends substantially tangentially with respect to a circle centered upon the longitudinal axis of the corresponding hub 5 and then a portion which defines a bend of substantially 90°, the center of curvature of said bend being coincident with, or quite close to, the longitudinal axis of said hub 5. The two portions of each recess 8 that have just been mentioned are considered as commencing from a corresponding radial plane which contains the front (with respect to the intended direction of rotation of the member 3 concerned) of the projections 7 that define each recess 8. The intended directions of operative rotation of the members 3 are indicated by arrows in FIGS. 1 and 3 of the drawings. The recesses 8 receive matchingly shaped fastening portions 9 of corresponding resilient tines 10, said tines 10 preferably, but not absolutely essentially, being formed from spring steel of circular cross-section. There are, of course, three tines 10 per member 3 and it will be seen from FIG. 3 of the drawings that the innermost extremities of the fastening portions 9 of those three tines 10 are located quite close to the outermost surface of the corresponding shaft 2. Naturally, each tine fastening portion 9 also comprises a short initial inner part that extends substantially tangentially with respect to a circle centered upon the longitudinal axis of the corresponding hub 5 and a following bend of substantially 90° in magnitude whose center of curvature is substantially coincident with, or is located quite close to, the longitudinal axis of said hub 5. The fastening portions 9 of the three tines 10 of each soil working or cultivating member 3 are secured in their appointed positions by three bolts 11 and an underlying clamping plate 12 which, when the bolts 11 are tightened, is disposed very close to the lowermost surfaces of the projections 7 (see FIG. 4). The three bolts 11 of each member 3 extend substantially parallel to the longitudinal axis of the corresponding hub 5 and, as can be seen in FIG. 3 of the drawings, lie at the three corners of the approximately triangular plate 6 and the similarly shaped clamping plate 12.

Where the fastening portions 9 of the tines 10 become free of confinement by the projections 7 of the corresponding plates 6, they become supports 13 of the corresponding tines 10, said supports 13 being inclined obliquely outwardly and rearwardly away from the fastening portions 9 with respect to the intended directions of operative rotation of the corresponding members 3. The longitudinal axis of each support 13 is substantially horizontally disposed when the axis of rotation of the corresponding shaft 2 is substantially vertically disposed and is coplanar with the center line of the corresponding fastening portion 9, the plane in question being substantially perpendicular to the longitudinal axis (axis of rotation) of the hub 5 concerned. The outermost end of each support is connected by way of an integral bend of substantially 90° to the upper end of a soil working portion 14 of the corresponding tine. The longitudinal axis of each soil working portion 14 can be considered as being substantially parallel to the longitudinal axis of the corresponding hub 5 although it is evident from the drawings that it is not truly parallel thereto. In fact, it is of rectilinear configuration and extends downwardly from the corresponding support 13 towards the ground surface in trailing relationship (by a few degrees) from top to bottom with respect to the intended direction of operative rotation of the corresponding member 3.

When operatively rotated, each soil working or cultivating member 3 has an effective working width of substantially 50 cms. and, since the longitudinal axes of immediately neighbouring shafts 2 are spaced apart from one another by substantially the same distance, the resilient tines 10 of immediately neighbouring members 3 will work at least adjoining, and usually slightly overlapping, strips of soil so that the whole implement will cultivate a single broad strip of land which, in the case of the example illustrated in the accompanying drawings, will have a width of substantially 3 ms. Each shaft 2 is provided inside the hollow frame portion 1 with a corresponding straight- or spur-toothed pinion 15, each pinion having an effective diameter of substantially 165 mms. The two pinions 15 that correspond to each pair of immediately neighbouring members 3 are drivingly interconnected with one another by way of two similar intervening pinions 16 that are mounted on two rotary shafts 17 whose upper and lower ends are carried by ball bearings mounted in the upper and lower walls of the frame portion 1. In the example which is being described, there are six of the shafts 2 and ten of the shafts 17 and their longitudinal axes (the axes of rotation of all sixteen of those shafts) are contained in a single substantially vertical plane that is substantially perpendicular to the direction A. One of the two shafts 2 that is closest to the center of the implement has an upward extension through the top of the hollow frame portion 1 into a lower portion of a gear box 18 (see particularly FIG. 2). The shaft extension is splined and co-operates, inside said lower portion of the gear box 18, with the hub of a straight- and spur- toothed pinion 19 whose teeth are in driven mesh with those of a smaller pinion 20. The pinion 19 has a larger effective diameter than the similar pinions 15 and 16 and substantially twice the effective diameter of the pinion 20. The pinion 20 is fast in rotation with a substantially vertical shaft 21 upon which it is mounted, said shaft 21 extending upwardly above the pinion 20 into an upper portion of the gear box 18 and being provided, at its uppermost end, with a crown wheel or bevel pinion 22. The teeth of the crown wheel or bevel pinion 22 are in driven mesh with those of a smaller bevel pinion 23 mounted on a substantially horizontal shaft 24 that is in substantially parallel relationship with the direction A. The shaft 24 is driven from an overlying and parallel rotary input shaft 26 of the gear box 18 by way of a change-speed gear 25 that it is not necessary to describe in detail for the purposes of the present invention. However, briefly and as will be evident from the top right-hand corner of FIG. 2 of the drawings, the change-speed gear 25 comprises pairs of interchangeable and/or exchangeable pinions whose splined hubs will co-operate with the matchingly splined rearmost ends of the shafts 24 and 26 that project from the back of the upper portion of the gear box 18 into a quickly releasable, but sealed, cover of the change-speed gear 25. It will be evident that the particular pair of pinions that is chosen for use in the change-speed gear 25 and their arrangement relative to the shafts 24 and 26 will govern the transmission ratio from the shaft 26 to the shaft 24 and thus the speed at which the members 3 will revolve during operation of the implement in response to a more or less fixed speed of rotation applied to the forwardly projecting leading end of the input shaft 26 from the power take-off shaft of an agricultural tractor or other operating vehicle through the intermediary of a telescopic transmission shaft (not shown) which is of a construction that is known per se having universal joints at its opposite ends.

The opposite sides or ends of the hollow frame portion 1 are closed by substantially vertical side plates 27 that are in parallel relationship with one another and substantially parallel relationship with the direction A, it being noted from FIG. 1 of the drawings that said side plates 27 project rearwardly from behind the hollow frame portion 1 with respect to the remainder of that portion. Substantially horizontally aligned stub shafts 28 are provided at the tops and fronts of the two side plates 27 and arms 29 are turnable upwardly and downwardly about the corresponding stub shafts alongside the outer surfaces of the two plates 27. The arms 29 extend rearwardly from the stub shafts 28 and their angular positions about the axis defined by those two stub shafts can be set, in each case, by entering a bolt 30 through one of two holes in the arm 29 concerned and through one hole 30A (FIG. 2) in two curved rows of those holes 30A, the holes in each row being at the same distance from the axis defined by the stub shafts 28 which distance is, of course, the same as the distance from that axis of one of the two holes in the corresponding arm 29. The rearmost ends of the two arms 29 with respect to the direction A have a rotatable supporting member in the form of a ground roller 31 mounted between them with the aid of substantially horizontally aligned bearings in such a way that said roller 31 extends throughout substantially the whole working width of the six soil working or cultivating members 3. The substantially horizontal axis of rotation of the roller 31 is coincident with the longitudinal axis of a central tubular support 32 of that roller. Five support plates 33 of circular or substantially circular configuration are secured to the central tubular support 32 of the roller 31 in parallel relationship with one another and substantially parallel relationship with the direction A at regular intervals along the length of the roller, there being two of the support plates 33 located at the opposite ends of the tubular support 32. Each support plate 33 is formed close to its periphery with a plurality of regularly spaced apart holes and elongate elements 34 of tubular or rod-shaped formation are entered through the holes in the successive plates 33 so as to extend helically around the axis of rotation of the roller 31 in the manner that is illustrated in FIG. 1 of the drawings.

The front of the hollow frame portion 1 with respect to the direction A is provided with a coupling member or trestle 35 that is of substantially triangular configuration when seen in front or rear elevation, the coupling member or trestle 35 being constructed and arranged for co-operation with the three-point lifting device or hitch of an agricultural tractor or other operating vehicle. Locations close to the apex of the coupling member or trestle 35 are connected, for strengthening purposes, to the top and rear of the hollow frame portion 1 by two tie beams 36 that are inclined obliquely downwardly and rearwardly, with respect to the direction A, from the coupling member or trestle 35 to the hollow frame portion 1 in rearwardly divergent relationship.

In the use of the soil cultivating implement that has been described, its coupling member or trestle is connected to the three-point lifting device or hitch of an agricultural tractor or other operating vehicle and the rotary input shaft 26 of the gear box 18 is placed in driven connection with the power take-off shaft of the same agricultural tractor or other operating vehicle by way of the aforementioned known telescopic transmission shaft that is not illustrated in the drawings. The speed at which the members 3 should rotate in response to a more or less fixed speed of rotation applied to the rotary input shaft 26 will depend upon the nature and condition of the soil and upon the degree of fineness thereof that is required at the end of the cultivation. Bearing these factors in mind, the change-speed gear 25 is appropriately adjusted before work commences. Substantially the same factors dictate the maximum depth of penetration of the soil working portions 14 of the tines 10 into the soil which is desirable and this maximum depth of penetration is adjusted, before work commences, by setting the axis of rotation of the ground roller 31 at an appropriate level relative to the remainder of the implement. It will be realised that this is accomplished by entering the bolts 30 through appropriate holes 30A. As the implement moves in the direction A over a field whose soil is to be cultivated, the described transmission that extends between the rotary input shaft 26 and the shafts 2 will cause the members 3 to revolve in the directions that are indicated by the arrows in FIG. 1 of the drawings, it being noted that each member 3 revolves in the opposite direction to its neighbour, or to both of its neighbours, in the single row of six such members. The six members 3 work strips of land having widths of substantially 50 cms. and, as mentioned above, those strips of land will at least adjoin one another and will usually overlap one another to a small extent so that, in either case, a single broad strip of land having a width of substantially 3 ms. will be cultivated by the implement. In addition to performing its supporting function, the ground roller 31 that immediately follows the members 3 over the soil has a gentle compressing effect upon the crumbled soil and will act to crush any unbroken lumps of earth that may be left upon the soil surface by the immediately foregoing members 3. The ground roller 31 also acts to ensure that the worked soil is distributed substantially uniformly throughout the width of the implement and will entirely suppress, or very greatly reduce, any ridges of worked soil that might otherwise be formed in substantially parallel relationship with the direction A.

In view of the resilient formation of the tines 10, their soil working portions 14 are capable of deflecting to avoid damage upon meeting any stones or other firmly embedded obstacles. In particular, each support 13 is fixedly mounted by the corresponding fastening portion 9 only at the end thereof which is close to the corresponding shaft 2 and is torsionally deformable to an extent which gives the soil working portion 14 that is integral therewith considerable angular deflectability. The speed of rotation of the soil working members 3 may be low as compared with the soil working or cultivating members of some other rotary harrows or like implements because the soil working portions 14 of the tines 10 of each member 3 are spaced apart from the axis of rotation of that member by distances of substantially 25 cms. and this ensures that their speed of movement through the soil is entirely adequate despite the lower speed of revolution of the shafts 2. In this connection, it will be noted that the transmission in the gear box 18 is arranged for speed reduction, rather than increase, between the bevel pinion 23 and the straight- or spur-toothed pinion 19.

The torsionally deformable supports 13 by which the soil working portions 14 of the tines 10 are mounted enables those portions 14 to move through the soil in a more or less vibratory manner and this is advantageous inasmuch as the soil then tends to become crumbled along natural lines of fracture. Any tine 10 that should be damaged or broken or that becomes worn to an extent that reduces its effectiveness below an acceptable level can readily be replaced, as an individual, by an operation that merely entails loosening and retightening the three bolts 11 of the corresponding soil working or cultivating member 3.

Although certain features of the soil cultivating implement that have been described and/or that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating machine comprising a frame and a plurality of tined soil working members mounted on corresponding upwardly extending shafts, said shafts being supported on an elongated portion of said frame and extending in a row transverse to the direction of machine travel, said members being rotated about axes defined by said shafts and driving means connected to rotate said members, each member having downwardly extending tines with soil working portions laterally spaced from a corresponding shaft, the shafts of neighboring soil working members being drivenly engaged by meshed pinion gears and the tines of neighboring members being positioned to work overlapping and/or adjoining paths, shafts that define their axes of rotation and said respective shafts being located in said row, the tines of said member comprising at least three tines and each tine having a corresponding support portion, an inner part of said support portion being curved inwardly to at least partly surround the respective shaft of said soil working member, the inner parts of the tines being secured in connections adjacent the corresponding shaft and the remainder of said tines being deflectable with respect to said connections.

2. An implement as claimed in claim 1, wherein said inner part extends substantially tangentially with respect to a circle centered upon the axis of rotation of the corresponding soil working member.

3. An implement as claimed in claim 1, wherein each soil working member comprises three tines that are spaced apart from one another at about 120° intervals around the axis of rotation of that member.

4. An implement as claimed in claim 1, wherein the inner parts of said tines are clamped between a pair of vertically spaced apart plates of said support means, an upper plate having downwardly extending projections on its lower surface which define recesses and said parts being secured in said recesses.

5. An implement as claimed in claim 4, wherein said upper plate has a generally triangular configuration and at least some of said projections are located adjacent the corners of that plate.

6. An implement as claimed in claim 5, wherein each pair of plates is clamped together by bolt fastenings located adjacent said corners.

7. An implement as claimed in claim 1, wherein a supporting roller is arranged behind the soil working members with respect to the direction of travel, said supporting member being rotatable about a substantially horizontal axis and comprising a plurality of circumferentially mounted elongate elements that extend lengthwise around that axis.

* * * * *